United States Patent [19]

Hayami et al.

[11] Patent Number: 4,690,500

[45] Date of Patent: Sep. 1, 1987

[54] OPTICAL MULTIPLE FIBER

[75] Inventors: Hiroyuki Hayami, Itami; Atsushi Utsumi, Kawanishi, both of Japan

[73] Assignee: Dainichi-Nippon Cables, Ltd., Hyogo, Japan

[21] Appl. No.: 556,234

[22] PCT Filed: Feb. 26, 1983

[86] PCT No.: PCT/JP83/00057

§ 371 Date: Nov. 1, 1983

§ 102(e) Date: Nov. 1, 1983

[87] PCT Pub. No.: WO83/03144

PCT Pub. Date: Sep. 15, 1983

[30] Foreign Application Priority Data

Mar. 1, 1982 [JP] Japan .................. 57-32559

[51] Int. Cl.$^4$ .................. G02B 6/06
[52] U.S. Cl. .................. 350/96.25; 350/96.24; 350/96.26; 350/96.27; 350/96.29
[58] Field of Search ............ 350/96.10, 96.24, 96.25, 350/96.26, 96.27, 96.29, 96.30, 96.33, 96.34

[56] References Cited

U.S. PATENT DOCUMENTS

| | | | |
|---|---|---|---|
| 2,992,516 | 7/1961 | Norton .................. | 350/96.25 |
| 3,436,142 | 4/1969 | Siegmund et al. .......... | 350/96.25 |
| 3,502,455 | 3/1970 | Gardner .................. | 350/96.34 |
| 3,554,720 | 1/1971 | Crepet ................... | 350/96.27 |
| 4,613,205 | 9/1986 | Seiji et al. ............. | 350/96.25 |
| 4,615,583 | 10/1986 | Tsuno et al. ............. | 350/96.33 |

FOREIGN PATENT DOCUMENTS

| | | | |
|---|---|---|---|
| 49-106836 | 10/1974 | Japan ................... | 350/96.24 |
| 50-32811 | 10/1975 | Japan ................... | 350/96.24 |

OTHER PUBLICATIONS

Kaiser et al. "Low Loss Single Material Fibers Made of Pure Fused Silica" Bell Tech Jour., vol. 53, No. 6, 8/74, pp. 1021-1039.

Utsumi, A., et al., "Modified Rod-in-Tube Method for Low Loss Step-Index Optical Fiber", *Topical Meeting on Optical Fiber Transmission*, Washington, D.C., Mar. 1979.

Utsumi, A., et al., "Fiber Optics in Adverse Environments II", *SPIE*, 506 (1984), 176-183.

Shintani, S., et al., "Silica Glass Imageguides and Their Applications", *JARECT*, vol. 17, Optical Devices & Fibers (1985), 320-332.

"Diaguide Scope, A New Industrial Fiberscope for Upto 100 m Span", Dianichi-Nippon Cables, Ltd., Dec. 1982.

*Primary Examiner*—William L. Sikes
*Assistant Examiner*—Brian M. Healy
*Attorney, Agent, or Firm*—Armstrong, Nikaido, Marmelstein & Kubovcik

[57] ABSTRACT

An optical multiple fiber comprising a multiplicity of optical fibers which are fused together with each other, each optical fiber comprising a core made of pure silica glass and a cladding layer disposed on the core and made of a dopant-containing silica glass, characterized in that the thickness of the cladding layer satisfies the following equation (I):

$$2 D_1 \geq T_1 \geq 1.0 \ \mu m. \qquad (I)$$

wheren $T_1$ is the thickness of the cladding layer in $\mu m$. and $D_1$ is the outer diameter of the core in $\mu m$., in order to improve the image-transmitting capacity of the multiple fiber, including the sharpness and brightness of transmitted image.

16 Claims, 4 Drawing Figures

OPTICAL MULTIPLE FIBER

DESCRIPTION

1. Technical Field

The present invention relates to an optical multiple fiber (hereinafter simply referred to as "multiple fiber") having a construction that a multiplicity of silica glass optical fibers are fused together with each other and more particularly to a multiple fiber, each optical fiber of which consists of a pure silica glass core and a cladding layer thereon made of a silica glass containing a dopant and having a lower refractive index than pure silica glass.

2. Background Art

The above-mentioned multiple fiber which consists of optical fibers each having a core of pure silica glass retains desirable properties such as excellent heat resistance and radiation resistance inherent in pure silica glass, and therefore is useful as an image-guide for monitoring the inside of a high-temperature furnace, a nuclear reactor, and the like.

Generally, a silica glass multiple fiber is produced by bundling a multiplicity of optical fiber preforms or materials obtained by drawing the preform to reduce it in diameter (hereinafter, those two materials are generically referred to as "preform" simply) and drawing the resulting bundle at a high temperature, whereby each preform is reduced in diameter into an optical fiber and simultaneously adjacent optical fibers are fused together with each other.

As compared with the pure silica glass of the core, the dopant-containing silica glass of the cladding layer has a very low softening point and a very low resistance to deformation in softened state. For that reason, in the case of a multiple fiber produced by the above-mentioned drawing method, as illustrated in FIG. 1, the core 2 of each optical fiber 1 included in the multiple fiber retains a circular cross section similar to that of the core of the preform, while the cladding layer 3 on the core 2 is deformed to acquire a hexagonal outer shape in cross section and the cladding layer 3 having such outer shape is fused together with the cladding layers of the adjacent optical fibers, most of the optical fibers thus being arranged in such a manner that hexagons are most closely packed.

However, the production of the multiple fiber of silica glasses is very difficult as compared with multiple fibers of multi-component glasses because the softening point and melt viscosity of silica glass are much higher than those of multi-component glass. It is only recently that it became promising to produce such a silica glass multiple fiber. Under these circumstances, there are few studies dealing with such problems as how to improve various properties required for multiple fiber, such as image-transmitting capacity.

The present inventors have found that the sectional structure of each optical fiber included in a silica glass multiple fiber, especially the interrelationship between the core diameter and the cladding layer thickness, has a great influence on the various properties of the multiple fiber, including the image-transmitting capacity. This finding and an intensive study based thereon have led to the present invention.

DISCLOSURE OF THE INVENTION

The present invention provides a multiple fiber comprising a multiplicity of optical fibers fused together with each other, each optical fiber comprising a pure silica glass core and a cladding layer thereon made of a dopant-containing silica glass and having a thickness which satisfies the following equation (I):

$$2D_1 \geq T_1 \geq 1.0 \mu m. \tag{I}$$

wherein $T_1$ is the thickness of the cladding layer in $\mu m$, and $D_1$ is the outer diameter of the core in $\mu m$.

In the above, the cladding layer thickness $T_1$ means the shortest distance between a side of the hexagon defined by the contour of the deformed cladding layer and the core surface, as illustrated in FIG. 2.

DETAILED DESCRIPTION OF THE INVENTION

Figure 1:
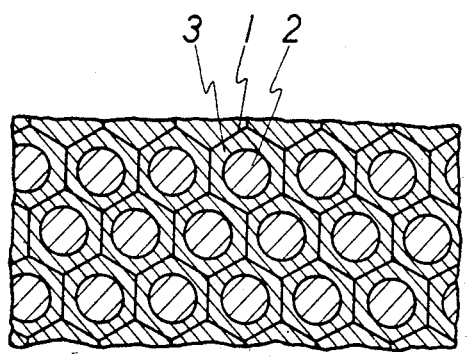
FIG. 1 is a cross-sectional view of a multiple fiber in accordance with the present invention, illustrating the disposition of optical fibers therein.
Figure 2:
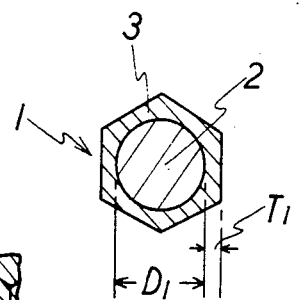
FIG. 2 is a cross-sectional view of an optical fiber included in a multiple fiber in accordance with the present invention and having a two-layer construction.

In a multiple fiber having a construction that a multiplicity of optical fibers are fused together and each optical fiber consists of a core made of a pure silica glass and a cladding layer made of a dopant-containing silica glass, most of the optical fibers have a hexagonal outer shape (namely, the cladding layer has a hexagonal outer shape) and they are arranged in the most closely packed state, as described above.

In the present invention, it has been found that when the thickness $T_1$ of the cladding layer of each optical fiber included in a multiple fiber and having the above-mentioned shape satisfies the equation (I) mentioned above, the sharpness of transmitted images is improved and the flexibility of the multiple fiber is ensured.

In case that the optical fibers included in a multiple fiber and fused together with each other, the chance of leak of light from individual optical fibers is not nil and the light leakage affects adversely the sharpness of transmitted image, and consequently the thickness of the cladding layer must be more than a certain value. On the other hand, the thermal expansion coefficient of the silica glass of the cladding layer increases with an increasing content of dopant, as compared with pure silica glass which constitutes the core. From the standpoint of preventing the light leakage, it is desirable to enlarge the difference between the refractive index of the core and that of the cladding layer by increasing the dopant content. However, an increased dopant content results in a very great difference in thermal expansion coefficient between the core and the cladding layer, which causes cracking of the cladding layer and thereby makes the production of preforms themselves difficult. Accordingly, the difference in refractive index between the core and the cladding layer cannot be very great. For that reason, the cladding layer thickness must be increased in order to prevent the light leakage.

As a result of research by the present inventors, it has been found that when the thickness $T_1$ of the cladding layer of each optical fiber included in a multiple fiber is at least 1.0 μm., preferably at least 1.3 μm., more preferably at least 1.5 μm., and most preferably at least 1.8 μm., the above-mentioned light leakage is markedly reduced, hence the sharpness of transmitted images is improved. Moreover, when the cladding layer thickness $T_1$ is not less than the above limit, leak of light can be prevented efficiently even when the difference in refractive index between the core and the cladding layer is small, for example, 0.012±0.006 (from the standpoints of further reducing light leakage and narrowing the differences in thermal expansion coefficient, softening point, thermal deformation resistance and other properties between the core and the cladding layer, the above-mentioned refractive index difference is preferably 0.012±0.004. As a result, the production of preforms becomes facilitated.

On the other hand, when the thickness of the cladding layer of each optical fiber included in a multiple fiber is too large, the core volume ratio (%) of the optical fiber as defined by the formula:

$$\frac{\text{Sectional area of core}}{\text{Sectional area of optical fiber}} \times 100$$

becomes small, hence the brightness of transmitted images is decreased and moreover the sharpness of transmitted images is decreased due to stray light resulting from an increased quantity of light entering the cladding layer from the multiple fiber end face. Furthermore, an excessive cladding layer thickness results in an increased outer diameter of optical fiber, which in turn leads to an increased outer diameter of the multiple fiber especially when the number of constituent optical fibers is great. The result is a decreased flexibility of the multiple fiber. For improving the multiple fiber flexibility, it is preferable that the outer diameter of the multiple fiber is not more than 5 mm.

In view of the above, it is preferable that the cladding layer thickness $T_1$ is not more than 2 times the outer diameter $D_1$ of the core in accordance with the present invention. The cladding layer thickness $T_1$ is more preferably not more than 1 time the core outer diameter $D_1$, and most preferably not more than 0.5 time the core outer diameter.

The core outer diameter $D_1$ is usually about 5 to about 15 μm.

When the core outer diameter $D_1$ is in the above range with the multiple fiber outer diameter being from 0.5 to 3 mm. and the number of constituent optical fibers contained in the multiple fiber being from 1,000 to 30,000, it is preferable that the cladding layer thickness $T_1$ satisfies the following equation (II):

$$3.0 \text{ μm.} \geq T_1 \geq 1.0 \text{ μm.} \quad \text{(II)}$$

in particular, the following equation (III):

$$2.3 \text{ μm.} \geq T_1 \geq 1.5 \text{ μm.} \quad \text{(III)}$$

In the present invention, it is also preferable that the core volume ratio is in the range of 20 to 60%. A smaller core volume ratio results in a decreased quantity of light transmitted. In case that a multiple fiber is used as an image-guide, the multiple fiber is required to have a core volume ratio of at least 20% in order that transmitted images have a practically required minimum level of brightness. On the other hand, a greater core volume ratio is desirable only from the standpoint of brightness of transmitted images. However, for obtaining a multiple fiber having a high core volume ratio, preforms having small cladding layer thickness must be prepared. In order that the thickness $T_1$ of the cladding layer of each constituent optical fiber included in a multiple fiber obtained from such preforms can securely be not less than the above-mentioned minimum value, namely 1.0 μm., the bundle of preforms must be drawn in such a manner that each constituent optical fiber have a large outer diameter as a necessity, but in that case a problem arises with respect to the flexibility of the multiple fiber. In view of the foregoing, the core volume ratio is preferably not more than 60%, more preferably from 25 to 50%, and most preferably from 35 to 45%.

As already mentioned above, when a multiple fiber having a construction that a multiplicity of optical fibers are fused together and each optical fiber consists of a pure silica glass core and a cladding layer of a dopant-containing silica glass is produced by the drawing method, each constituent optical fiber in the multiple fiber obtained bears a hexagonal contour in cross section, with the constituent optical fibers being arranged in such a manner that such hexagons are most closely packed, as shown in FIG. 1.

Figure 3:
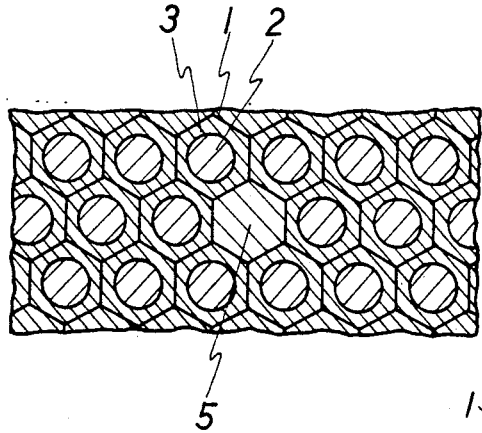
FIG. 3 is a cross-sectional view of a multiple fiber, illustrating the state that there is a lacking portion that is not occupied by an optical fiber.

However, if preforms are bundled irregularly, there may arise in some cases a portion 5 where an optical fiber is lacking in the multiple fiber obtained, as illustrated in FIG. 3. Although this lacking portion 5 is filled up with a part of the cladding layer-constituting silica glass coming from the surrounding constituent optical fibers, there remains a problem that this filling up reduces the thickness of the cladding layer of the surrounding optical fibers, whereby the function of the cladding layer becomes poor or is lost. Therefore, if such a lacking portion 5 once is formed, the multiple fiber composed of optical fibers each having a pure silica glass core inevitably contains optical fibers deficient with respect to the cladding layer thickness mentioned above. Such multiple fiber, when used as an image-guide, is not always satisfactory with respect to image-transmitting capacity or, in other words, sharpness of transmitted images.

In view of the above, the present invention further proposes a multiple fiber composed of optical fibers each having a sufficiently thick cladding layer even if the cladding layer silica glass would flow into the lacking portion 5 as shown in FIG. 3. This object is accomplished when the thickness $T_1$ of the cladding layer of the constituent optical fiber satisfies the following equation (IV):

$$2D_1 \geq T_1 \geq 0.05D_1 + 1.0 \text{ μm.} \quad \text{(IV)}$$

preferably the following equation (V):

$$2D_1 \geq T_1 \geq 0.06D_1 + 1.0 \text{ μm.} \quad \text{(V)}$$

In cases where optical fibers are arranged in a multiple fiber in the manner of most closely packed hexagons without any lacking portion 5, as shown in FIG. 1, the extent of light leakage is markedly reduced and the sharpness of transmitted images is improved, as mentioned previously, when the thickness $T_1$ of the cladding layer of each constituent optical fiber is at least 1.0 μm., preferably at least 1.3 μm., more preferably at least 1.5 μm. If the thickness $T_1$ of the cladding layer of each constituent optical fiber satisfies the above equation (IV) or (V), sharpness of transmitted images can be secured even when there is a lacking portion 5 as shown in FIG. 3. This is because even most of the constituent optical fibers which exist adjacent to the lacking portion 5 and whose cladding layer has partly flowed into the lacking portion 5 still have a cladding layer thickness of at least 1.0 μm.

Figure 4:
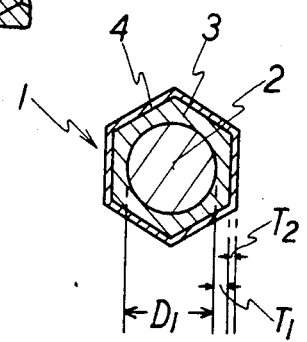
FIG. 4 is a cross-sectional view of an optical fiber included in a multiple fiber in accordance with the present invention and having a three-layer construction.

In accordance with the present invention, each optical fiber constituting the multiple fiber may have either a two-layer construction composed of a core and a cladding layer or three-layer construction having further on the cladding layer a third thin layer, for example, a support layer made of natural or synthetic silica glass. When two-layered performs consisting of only a core and a cladding layer are drawn, the structure of the cladding layer may in some cases deviate from the hexagonal structure as shown in FIG. 1 due to excessive fluidization of the cladding layer material. When three-layered performs having the above third thin layer are used, there is an advantage that such excessive fluidization of the cladding layer is prevented and cladding layers having an outer shape more close to a regular hexagon are formed. In the case of a multiple fiber composed of three-layered optical fibers, the optical fibers are fused together by mutual fusion of the third thin layers which are present on the respective cladding layers. In that case, each optical fiber has such a structure that a third layer 4 having a hexagonal contour in cross section exists on a cladding layer 3 having a hexagonal contour in cross section, as shown in FIG. 4. Constituent optical fibers having such a structure are arranged, as in the case of two-layered optical fibers, in the manner of most closely packed hexagons as shown in FIG. 1.

It is preferable that the thickness $T_2$ of the third layer 4 satisfies the following equation (VI):

$$1.0 \ \mu m. \geq T_2 \geq 0.01 \ \mu m. \tag{VI}$$

Herein, the thickness $T_2$ of the third layer 4 means, as illustrated in FIG. 4, the distance between a side of the hexagon of the cladding layer 3 and the side parallel thereto of the hexagon of the third layer 4.

When the thickness of the third layer is too small, the cladding layer expands with heat during drawing, whereby the third layer is broken and it is meaningless to provide the third layer. For avoiding such breakage, it is preferable that the third layer thickness $T_2$ is at least 0.01 μm., more preferably at least 0.05 μm., and most preferably at least 0.1 μm. On the other hand, an excessively thick third layer reduces the core volume ratio to lower the brightness of transmitted images and further allows an increased qunatity of light to enter the third layer and behave as stray light, making transmitted images indistinct or blurred. Therefore, it is desirable that the thickness $T_2$ of the third layer is not more than 1.0 μm., more preferably not more than 0.7 μm., and most preferably not more than 0,.5 μm.

Even when each optical fiber contained in a multiple fiber has the above-mentioned three-layer construction, the cladding layer thickness $T_1$ is required to satisfy the above-mentioned equation (I), (II) or (III). It is also necessary that the core volume ratio is from 20 to 60%, preferably from 25 to 50%, more preferably from 35 to 45%.

Even in a multiple fiber composed of three-layered optical fibers, there may exist a lacking portion 5 as shown in FIG. 3. In that case, the lacking portion 5 is filled up with the materials which flow thereinto from the cladding layer and the third layer thereon. If the cladding layer thickness $T_1$ satisfies the above-mentioned equation (IV) or (V), the cladding layer of these optical fibers that are located around the lacking portion 5 can have a thickness of at least 1.0 μm.

The multiple fiber of the present invention can be produced by bundling a required number of two-layered performs composed of a core and a cladding layer alone or three-layered preforms composed of a core, a cladding layer and a third thin layer and drawing the bundle of the preforms at a temperature of 1,900° to 2,000° C. Although the outer diameter of the resulting multiple fiber and the size of each constituent optical fiber contained in the multiple fiber may vary depending on the dimensional proportions of the layers of the preforms used and the extent of drawing, a multiple fiber having a desired structure can be easily produced by performing simple trials using several preforms different in structure and varying the extent of drawing.

Although the multiple fiber of the present invention can be produced by drawing a bundle of preforms alone, it is advantageous to produce the multiple fiber by filling a pipe made of a synthetic or natural silica glass (hereinafter referred to as "silica glass skin pipe") with preforms arranged orderly and drawing the preforms together with the pipe. The instant multiple fiber obtained in that way has a structure such that a silica glass skin layer resulting from the silica glass skin pipe is present fusedly surrounding the group of constituent optical fibers fused together. Presence of unevenness or flaws on the surface of the multiple fiber may lead to breakage upon bending, or reduce the flexibility to be mentioned hereinafter. The multiple fiber obtained by drawing a bundle of preforms alone tends to have an uneven outer surface. When the multiple fiber has a silica glass skin layer, unevenness or flaws are sparingly formed thereon and constant flexibility can be obtained easily. There are advantageous features.

In accordance with the present invention, the silica glass skin layer has a thickness of 10 to 300 μm., preferably 30 to 200 μm., and more preferably 50 to 100 μm. The silica glass constituting the silica glass skin layer has preferably a drawable temperature of at least 1,800° C., more preferably at least 1,900° C. The drawable temperature is defined as follows: A pipe made of the same silica glass material as that of the skin layer and having an inner diameter of 23 mm. and an outer diameter of 26 mm. is melted and drawn to reduce the pipe in diameter, giving a pipe having an inner diameter of 2.3 mm. and an outer diameter of 2.6 mm. The drawable temperature means the lowest temperature that permits to take up the pipe of the reduced diameter at a rate of 0.5 m./min. with a drawing tension of not more than 500 g.

BEST MODE FOR CARRYING OUT THE INVENTION

The present invention is explained in more detail by means of the following Examples and Comparative Examples.

In the following Examples and Comparative Examples, various materials used for forming the cladding layers were a pure silica glass doped with $B_2O_3$ and fluorine and the refractive index of each material was adjusted by varying the amounts of the dopants. The difference in refractive index between the pure silica glass of the core and the dopant-containing silica glass of the cladding layer is represented by $\Delta n$.

The image-resolving power and flexibility of each multiple fiber were determined and evaluated by the following methods:

(1) Image-resolving power

A black paint was applied to the whole surface of a multiple fiber having a length of 50 cm. for excluding external light. Several millimeter portions on both ends were then cut off, and both the end faces were optically polished. A rod-shaped converging type image-forming lens having an outer diameter of 2 mm. and a visual field angle of 35° ("Selfoc Lens" made by Nippon Sheet Glass Company, Limited, SLS: 2.0 mm., pitch: 0.25) as an objective lens was brought into close contact with one polished end face of the multiple fiber. An external visual field was imaged on the end face of the multiple fiber and the image was allowed to the transmitted to the other end face of the multiple fiber, where the image was enlarged by means of a convex lens having a focal length of 15 mm. as an eye lens for observation.

As the object of observation, there was prepared a test chart carrying thereon a blue letter "A" having a large line width of 2 mm. on a red ground. The test chart was placed at a distance of 100 mm. from the object lens and the boundary between the blue letter "A" and the red ground was observed through the eye lens. The observation results were graded according to the following criteria:

Grade E: The boundary exhibited an excellent contrast.

Grade G: The boundary exhibited a good contrast.

Grade F: The boundary was somewhat blurred but the letter "A" could be identified distinctly.

Grade P: A color between red and blue was observed in the boundary due to a great degree of light leakage.

Grade VP: No boundary could be observed.

(2) Flexibility

A multiple fiber was bent to a loop-like form and the loop diameter was reduced gradually. The flexibility is defined as the loop diameter (mm.) when the multiple fiber was broken.

EXAMPLE 1

A silica glass skin pipe of 20 cm. in length was filled with about 12,000 preforms arranged orderly and each having a core outer diameter/cladding layer thickness/silica support layer thickness ratio of 10:4.0:0.4, $\Delta n$ of 0.012 and an outer diameter of 260 $\mu$m. and the whole was drawn at about 2,000° C. to give a multiple fiber having an outer diameter of 1.5 mm. and composed of constituent optical fibers fused together with each other and each having a core outer diameter of 6.1 $\mu$m., a cladding layer thickness $T_1$ of 2.2 $\mu$m., a support layer thickness $T_2$ of 0.2 $\mu$m. and a core volume ratio of 28.3% and further carrying a silica glass skin layer having a thickness of 120 $\mu$m. and fusedly surrounding the optical fiber aggregate. The image-resolving power and flexibility of the multiple fiber were grade E and 290 mm., respectively.

EXAMPLES 2 to 13 and Comparative Examples 1 to 4

The procedures of Example 1 were repeated using an adequate number of preforms of each species and varying the extent of drawing to give various multiple fibers having the structures and characteristics as shown in the following table. As an additional finding, there is mentioned the fact that the transmitted image was very dark in the case of the multiple fibers obtained in Comprative Example 2 and Example 9.

| | Construction of multiple fiber | | | | | | | | Characteristics of multiple fiber | |
|---|---|---|---|---|---|---|---|---|---|---|
| | | | | Construction of optical fiber | | | | | | |
| | Outer diameter (mm.) | Silica glass skin layer thickness ($\mu$m.) | Number of optical fibers | Core outer diameter ($\mu$m.) | Cladding layer thickness $T_1$ ($\mu$m.) | $\Delta n$ | Supporting layer thickness $T_2$ ($\mu$m.) | Core volume ratio (%) | Image-resolving power (grade) | Flexibility (mm.) |
| Com. Ex. 1 | 0.5 | 22 | 11,980 | 2.3 | 0.8 | 0.012 | 0.1 | 29 | P | <100 |
| Ex. 2 | 0.8 | 33 | 11,980 | 3.5 | 1.2 | 0.012 | 0.15 | 29 | G | 100 |
| Ex. 3 | 1.5 | 76 | 11,980 | 6.0 | 1.9 | 0.012 | 0.4 | 29 | E | 290 |
| Ex. 4 | 1.8 | 77 | 11,980 | 8.8 | 2.8 | 0.012 | 0.6 | 29 | E | 400 |
| Ex. 5 | 1.8 | 77 | 11,980 | 8.8 | 2.8 | 0.015 | 0.6 | 29 | E | 400 |
| Ex. 6 | 1.8 | 77 | 11,980 | 8.8 | 2.8 | 0.010 | 0.6 | 29 | E | 400 |
| Ex. 7 | 0.8 | 33 | 11,980 | 3.5 | 1.2 | 0.010 | 0.15 | 29 | G | 100 |
| Com. Ex. 2 | 7.1 | 55 | 9,900 | 12.9 | 27.0 | 0.012 | 0.65 | 4 | E | >4,000 |
| Com. Ex. 3 | 1.7 | 55 | 9,900 | 12.9 | 0.5 | 0.012 | 0.65 | 65 | VP | 100 |
| Ex. 8 | 2.0 | 55 | 9,900 | 12.9 | 1.7 | 0.012 | 0.65 | 43 | E | 300 |
| Ex. 9 | 2.0 | 60 | 25,000 | 5.1 | 2.9 | 0.012 | 0.2 | 18 | E | 500 |
| Com. Ex. 4 | 2.0 | 60 | 25,000 | 10.1 | 0.3 | 0.012 | 0.4 | 70 | VP | 500 |
| Ex. 10 | 2.0 | 60 | 25,000 | 7.1 | 1.9 | 0.012 | 0.3 | 35 | E | 500 |
| Ex. 11 | 2.0 | 60 | 25,000 | 8.8 | 1.2 | 0.012 | 0.06 | 55 | E | 500 |
| Ex. 12 | 1.3 | 72 | 10,000 | 8.6 | 1.8 | 0.010 | — | 49 | E | 200 |
| Ex. 13 | 0.9 | 60 | 3,160 | 8.3 | 1.7 | 0.012 | 0.5 | 39 | E | 100 |

We claim:

1. An optical multiple fiber comprising a plurality of optical fibers which are fused together with each other, each optical fiber comprising a core made from pure silica glass and which has a substantially circular cross-section and a cladding layer disposed directly on the core and made of a dopant-containing silica glass having a lower refractive index than the pure silica glass of the core, said cladding layer having a thickness which satisfies the following equation (I):

$$2D_1 \geq T_1 \geq 1.0 \ \mu m \quad (I)$$

wherein $T_1$ is the thickness of the cladding layer in $\mu$m and $D_1$ is the diameter of the core in $\mu$m and $T_1 \leq D_1$; the difference in refractive index between the core and the cladding layer being from 0.008 to 0.016 and the diameter of the optical multiple fiber being 5 mm or less.

2. The multiple fiber of claim 1, wherein the cladding layer thickness $T_1$ satisfies the following equation (II):

$$3.0 \ \mu m. \geq T_1 \geq 1.0 \ \mu m. \tag{II}$$

3. The multiple fiber of claim 1, wherein the cladding layer thickness $T_1$ satisfies the above equation (II) and the core volume ratio of each optical fiber as defined by the formula:

$$\frac{\text{sectional area of core}}{\text{sectional area of optical fiber}} \times 100$$

is from 20 to 60%.

4. The multiple fiber of claim 1, wherein the cladding layer thickness $T_1$ satisfies the following equation (IV):

$$2D_1 \geq T_1 \geq 0.05 D_1 + 1.0 \ \mu m. \tag{IV}$$

5. The multiple fiber of claim 1, 2, 3 or 4, wherein each optical fiber further has a silica glass support layer disposed on the cladding layer.

6. The multiple fiber of claim 1, 2, 3 or 4, which has a silica glass skin layer having a thickness of 10 to 300 $\mu$m. as an outermost layer of the multiple fiber.

7. The multiple fiber of claim 5, which has a silica glass skin layer having a thickness of 10 to 300 $\mu$m. as an outermost layer of the multiple fiber.

8. The multiple fiber of claim 1, 2, 3 or 4, wherein the multiple fiber has a silica glass skin layer having a thickness of 10 to 300 $\mu$m. as an outermost layer thereof; and the outer diameter of the multiple fiber is from 0.5 to 3 mm.

9. The multiple fiber of claim 5, wherein the multiple fiber has a silica glass skin layer having a thickness of 10 to 300 $\mu$m. as an outermost layer thereof; and the outer diameter of the multiple fiber is from 0.5 to 3 mm.

10. The multiple fiber of claim 7, wherein the multiple fiber is composed of 1,000 to 30,000 optical fibers each having a silica glass support layer thickness $T_2$ of 0.01 to 1.0 $\mu$m.; the silica glass skin layer is made of a silica glass having a drawable temperature of not less than 1,800° C. and having a thickness of 10 to 300 $\mu$m.; and the outer diameter of the multiple fiber is from 0.5 to 3 mm.

11. The multiple fiber of claim 1 or 2, wherein the multiple fiber comprises from about 1,000 to about 30,000 of said optical fibers.

12. The multiple fiber of claim 2, wherein the cladding layer thickness $T_1$ satisfies the following equation (III):

$$2.3 \ \mu m \geq T_1 \geq 1.5 \ \mu m. \tag{III}$$

13. The multiple fiber of claim 11, wherein the thickness $T_1$ of the cladding layer is at least 1.3 $\mu$m.

14. The multiple fiber of claim 11, wherein the thickness $T_1$ of the cladding layer is at least 1.5 $\mu$m.

15. The multiple fiber of claim 11, wherein the thickness $T_1$ of the cladding layer is at least 1.8 $\mu$m.

16. The multiple fiber of claim 4, wherein the cladding layer thickness $T_1$ satisfies the following equation (V):

$$2D_1 \geq T_1 \geq 0.06 D_1 + 1.0 \ \mu m. \tag{V}$$

* * * * *